March 23, 1937.　　W. E. URSCHEL　　2,074,677
FRUIT OR VEGETABLE TOPPER
Filed Jan. 16, 1933　　4 Sheets-Sheet 1

INVENTOR
William E. Urschel
BY
ATTORNEY

March 23, 1937.  W. E. URSCHEL  2,074,677
FRUIT OR VEGETABLE TOPPER
Filed Jan. 16, 1933   4 Sheets-Sheet 3

INVENTOR
William E. Urschel
BY
ATTORNEY

March 23, 1937. W. E. URSCHEL 2,074,677
FRUIT OR VEGETABLE TOPPER
Filed Jan. 16, 1933 4 Sheets-Sheet 4
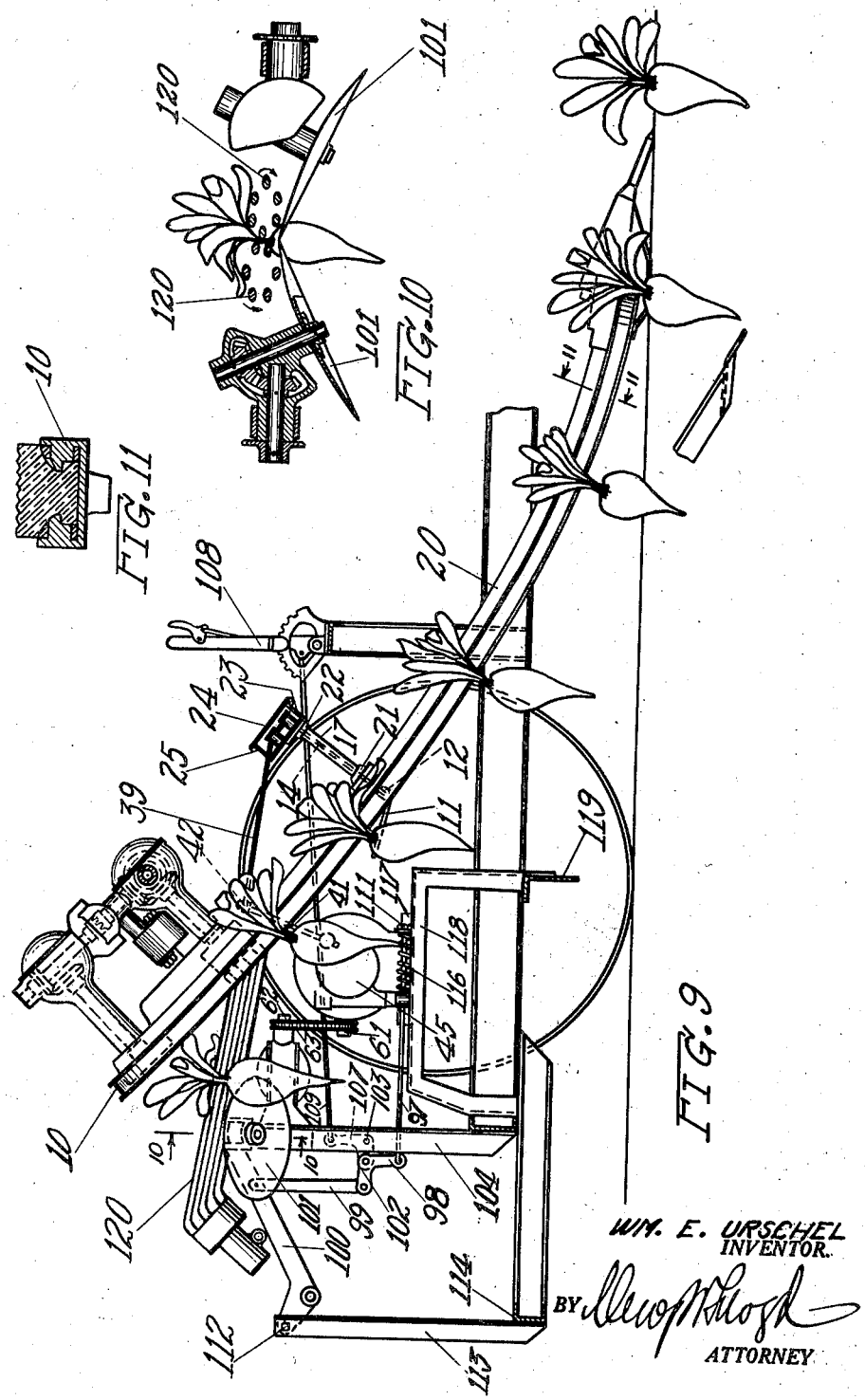

Patented Mar. 23, 1937

2,074,677

UNITED STATES PATENT OFFICE 2,074,677

FRUIT OR VEGETABLE TOPPER

William E. Urschel, Valparaiso, Ind.

Application January 16, 1933, Serial No. 651,948

22 Claims. (Cl. 146—85)

This invention relates to an apparatus for topping fruits or vegetables. The invention is particularly illustrated in connection with a device for topping sugar beets and in connection with a sugar beet harvesting machine. For the purposes of exemplification and illustration, but not by way of limitation, my invention is particularly shown and described in connection with a harvesting machine forming the subject matter of my Patent No. 1,964,896, issued July 3, 1934 and entitled Beet harvester.

In sugar beets, it is considered desirable to remove the top portion of the body of the beet. The removed portion is relatively small in proportion to the body of the beet, and is low in sugar content. The toughness of the removed portion is such that it may be injurious to the various machines used in the recovery of beet juice for the production of sugar.

Such top portion of low sugar content varies with the size of the beet, therefore it is necessary to remove a larger portion of the top from large beets than from smaller ones. Since the size of beets in a field run irregularly, no attempt to top the beets with knives in a fixed position has proved wholly successful, since the knives when set to properly top a large beet have severed too great a portion from small beets. Setting the knives in a manner to properly sever the correct part of the average sized beet is not successful because the great variance in the size of the sugar beets is such that the average sized beet as an actuality is a rarity. Instead of causing knives to act upon beets while grasped by pulling members as is the conventional manner employed in most harvesters combining topping members, in the present device the beets are removed from the pulling means and presented to knives by a special guiding instrumentality. The guide members convey the beets rearwardly in the machine and aline the top portions of the body of the beets in the same plane, before presenting them to a cutting instrumentality. Beets presented to cutters in this manner may be properly topped by varying the position of the cutting plane of the knives relatively to the plane with which the tops of the bodies of the beets are alined. An adjustment of the knives controlled by each beet to be topped has been provided herein to insure the proper position of the knives beneath the plane of the beet top before such knives act upon the beet. In this manner, a satisfactory result is had in respect to the removal of proper portions of the crop along with leaf appendages.

One of the objects of the invention is to provide a mechanism for the control of a topping means in a fruit or vegetable harvesting machine, preferably a sugar beet harvesting machine, which exactly and automatically governs the amount of top portions severed in accord with the size of the individual vegetables or fruits such as sugar beets.

Another object of the invention is to provide an improved adjustable holder for a topping means included in a sugar beet harvester permitting of the regulation of the position of the topping means before it acts upon each sugar beet presented to it, thus enabling the amputation of different portions of a top from the body of the beet, the portion severed being determined by the size of the sugar beet.

Other objects of my invention are to provide a device for automatically regulating the cutting means which performs the topping operation so that a predetermined amount of the vegetable or fruit may be cut off or topped in proportion to or to correspond with certain physical characteristics of the vegetable or fruit, such, for instance, as size through its largest diameter, wherein the adjustment of the cutting means will be capable of more precise, delicate, and fine adjustment, will act more positively to shift the cutting means, and particularly without imposing any substantial pressure upon the fruit or vegetable to be cut; to provide a topping mechanism wherein certain physical characteristics of the fruit or vegetable to be topped, such, for instance, as its size, automatically control and determine the amount of fruit or vegetable to be cut off, and wherein power means, such, for instance, as a prime mover, is utilized for shifting the cutting means, and wherein the fruit or vegetable itself is utilized to actuate a control means or regulator for automatically governing the actuation of the power means in a predetermined manner in accordance with characteristics of the fruit or vegetable to be topped whereby to shift the cutting means a predetermined amount; and to provide a harvesting machine, particularly in connection with a sugar beet harvesting machine, wherein there is provided conveying means which conveys the beets in single file through the machine after they are dug from the soil, and wherein means is provided actuated by a source of power upon the harvesting machine for power shifting the cutting means for the topping operation, and wherein delicately adjustable means disposed in the path of movement of the sugar beets is provided for automatically controlling the power means to cause the automatic shifting of the cutting means by the power means in accordance with physical characteristics of each beet.

These objects and such other objects as may hereinafter appear are attained by the mechanism shown in the accompanying four sheets of drawings illustrating one form of the invention, and in which:

Figure 1 is a plan view of part of the mechanism embodying the invention which, for purposes of exemplification, is shown and described as attached to a sugar beet harvester disclosed in my prior Patent No. 1,964,896 of July 3, 1934, and to which patent reference is made for a fuller disclosure of the operation of the power driving mechanism for actuating certain drive shafts of the machine which are utilized in the present invention for power actuating the cutting mechanism and for power actuating the mechanism which adjustably shifts the cutting mechanism.

Figure 9 is a vertical median longitudinal view of the device on a line passing horizontally through the center of Figure 1;

Figure 10 is a view on the section indicated by line 10—10 of Figure 9, of the knives and roller bars; and Figure 11 is a cross section of the conveyor belt on line 11—11 of Figure 9.

Similar numerals refer to similar parts throughout the several views and in the description of the invention which follows.

Beets are pulled and moved by puller belts 10, a full and complete description and illustration of which and of the driving mechanism for them, is to be found in the co-pending application of William E. Urschel, the applicant here, serially numbered 342,032, filed February 23, 1929, entitled Bean harvester, and in other applications for Letters Patent in the name of the present applicant.

Figure 2:
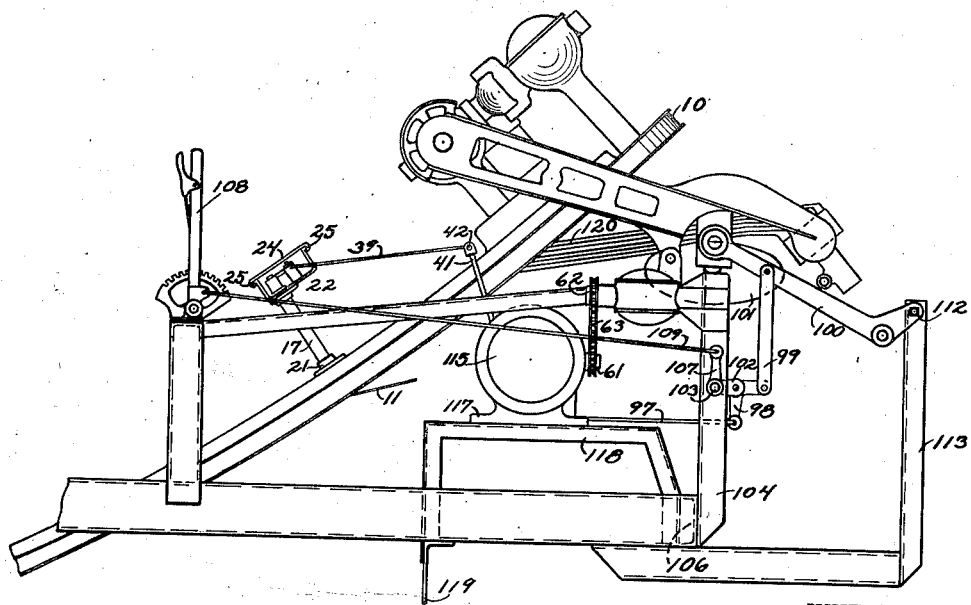
Figure 2 is a side elevation of the device shown in Figure 1 as it appears when attached to such a sugar beet harvester.

Beets removed from the soil by a sugar beet harvester such as is shown are conveyed rearwardly in the machine. During their travel, the beets come in contact with fruit or vegetable calibrating or indexing means specifically in the form of feelers or fingers 11 (see Figures 2 and 7) secured in any conventional manner to members 12 fastened to shafts 14 by pins 13.

The shafts 14 are rotatably mounted in bushings 15 and 16 secured to standards 17, and are held against sliding lengthwise in said bushings by the heretofore mentioned members 12 and collars 18 secured to said shafts by pins 19.

Standards 17 are attached to puller frames 20 by flanges 21 bolted thereto, said flanges being in threaded relation with the standards 17. At the upper end of the standards 17 and in threaded relation therewith is a set of flanges 22 to which is bolted or otherwise secured a box 23 which encloses and protects a positioning pin setting apparatus.

A sliding cover 24 is provided for the said box, the grooves at 25 in the cover engaging with the flanges 26 on the sides of the box 23. Levers 27 are welded or otherwise attached to collars 28 slipped over and secured to the collars 18 by setscrews 29.

An equalizing mechanism consisting of a strap 30 and connecting links 31 pivotally connected to each other by pins 32 transmits the oscillating motion produced by the levers 27 rotated by shafts 14 to a lever 33 through a connecting pin 34.

The lever 33 is pivotally mounted on the box 23 by a pin 125 and washer 35. Beets grasped by puller belts 10 and conveyed rearwardly strike against the fingers 11 forcing the fingers apart until the distance between their adjacent points is equal to approximately the largest diameter of the beet passing between them. Since the fingers 11 are secured to shafts 14, whenever the points of said fingers are spread apart, said fingers cause the rotation of the shafts 14 producing an oscillating motion in the levers 27 which motion is in turn transmitted to the lever 33 through the equalizing lever 30 and the connecting links 31.

Figure 1:
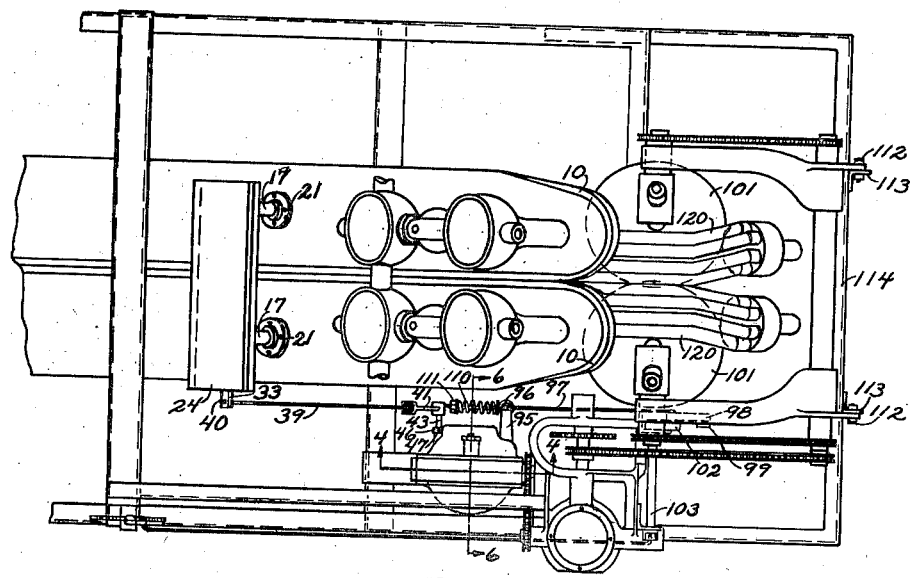

Springs 36 secured at one end to the extended portions of levers 27 at 37 and at the other to the side of box 23 at points 38 reset the fingers 11 after a beet has passed between them. A rod 39 (Figures 1 and 2) pivotally attached to the lever 33 at point 40 connects said lever with a lever 41 upon which said rod is pivotally mounted by pin 42. Lever 41 is pinned to a shaft 43 (Figures 1 and 4) which is rotatably mounted in a bearing 44 formed in a pin carrier holder 45. The shaft 43 is prevented from sliding lengthwise in bearing 44 by collar 46 pinned to said shaft by a pin 47, and also by a pin setting lever 48 secured by pin 48a.

Beets conveyed rearwardly by the puller belts 10 will as heretofore stated move the points of fingers 11 apart a distance governed by the size of the beet. This movement of said fingers is proportionately transferred to said pin setting lever 48. The pin carrier 49 is a cylinder with extended ridges at each end forming a sort of spool. In the extended ridges are a plurality of rectangular shaped openings 50 oppositely disposed and so shaped as to receive positioning pins 51. Extending outwardly at each end of said member 49 are hubs 52 and 53.

The pin carrier 49 is fastened to a shaft 54 by a key 55 secured by rivets 126 and held from lengthwise movement along the shaft 54 by the pin 56 and the shoulder on shaft 54 at point 57. Around the periphery of the pin carrier 49 between the extended ridges are a series of saw tooth shaped projections 58 with which engage similarly shaped projections 66 on pins 51.

Figure 4:
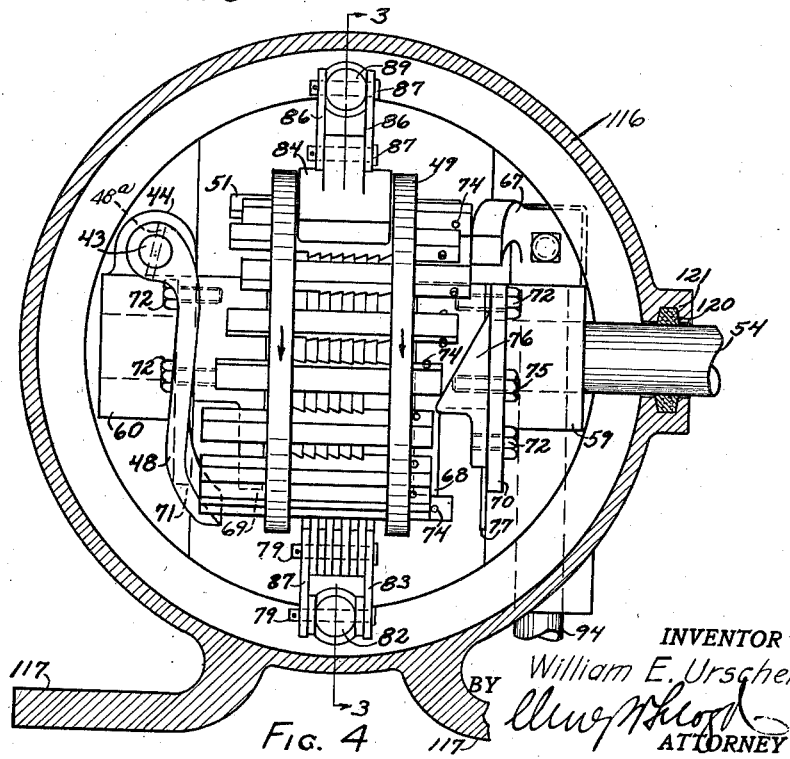
Figure 4 is also a partial section of the apparatus illustrated in Figure 3 taken on the line 4—4 of Figure 1 looking in the direction indicated by the arrows.
Figure 5:
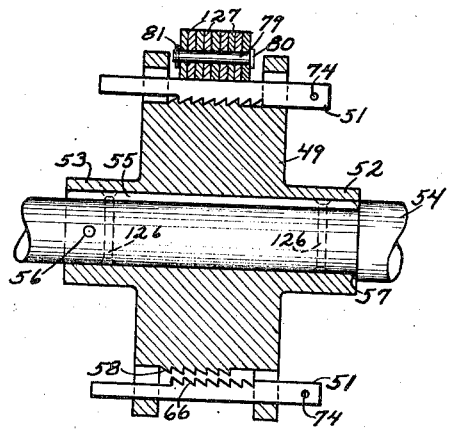
Figure 5 is a sectional view of the positioning pin carrier taken on the line 5—5 in Figure 3 looking in the direction indicated by the arrows.

It can be seen from Figure 5 that the pins 51 on the lower side of member 49 disengage from the heretofore mentioned ridges or projections 58 due to the fact that the rectangular openings 50 are longer than the height of pins 51. The shaft 54, to which the pin carrier 49 is attached, is journaled in bearings 59 and 60 formed in the holder member 45. At one end of the said shaft 54 is a sprocket 61 (Figure 2) connected to a drive sprocket 62 by a roller chain 63, thus furnishing means to rotate the pin carrier 49 in the direction indicated by the arrows in Figure 4.

Each pin 51 in the carrier 49 corresponds to a beet passing between the fingers 11, so that when the pins 51 reach the lower side of the cylinder 49, they are pushed toward bearing 59 by the pin setting lever 48, the distance the pin is moved depending on the angle through which the lever 48 is turned, which angle in turn is governed by the size of a beet passing between the fingers 11, the size of the beet determining the angle through which shafts 14 are rotated.

Figure 3:
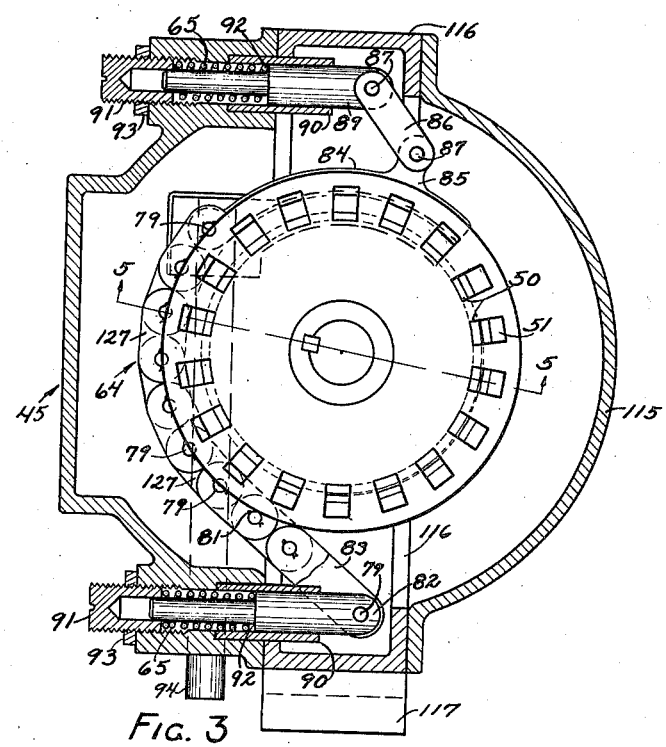
Figure 3 is a partial vertical section of the topping means positioning apparatus taken on the line 3—3 of Figure 4 looking in the direction indicated by the arrows.

Thus, a large beet would cause one of the pins 51 to be pushed in toward bearing 59 farther than would a small sized beet. The revolution of carrier 49 conveys pins 51, set over by the said lever 48, upward in an arcuate path, said pins coming in contact with a chain 64 (Figure 3). Pressure of the chain 64 caused by the action of springs 65 forces the pins 51 inwardly toward the axis of member 49 causing the projections 66 on said pins to interlock with similar projections 58 on the surface of member 49.

Due to the contour of projections 58 and 66, when said projections are interlocked, pins 51 continue on their arcuate path. Each pin forces the end of lever 67 (Figure 4) in a direction toward bearing 59 for varied distances depending upon the amount each pin has been set over by the lever 48.

Figure 6:
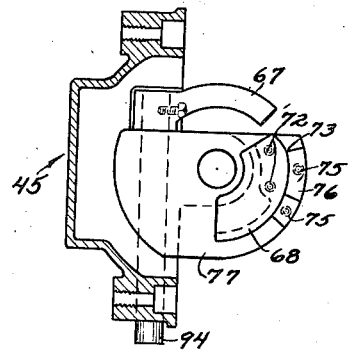
Figure 6 is a sectional view of the pin carrier holder taken on the line 6—6 in Figure 1 looking in the direction indicated by the arrows.

Following their disengagement from lever 67 pins 51 come in contact with members 68 and 69 (Figures 4 and 6) secured to extensions 70 and 71 on the inner edges of bearings 59 and 60 by cap screws 72. The change in diameter of the outer edges of the members 68 and 69 at points 73 causes the pins 51 to be pushed outwardly from the axis of member 49, disengaging the ridges 66 on pins 51 from the ridges 58 on member 49, permitting said pins to be moved freely lengthwise in the rectangular openings 50.

After the pins 51 are pushed outward and held in this position by the members 68 and 69, the pins 51 come in contact with a wedge 76 secured to extension 78 of the bearing 59 by the cap-screws 75. The wedge 76 forces said pins 51 toward bearing 60. Said pins are prevented from sliding too far by the projecting pins 74 inserted near the ends thereof.

Since pins 74 are all set at an equal distance from the end of pins 51, the ends of said pins are thus placed in alinement with each other by the action of wedge 76. The pins 51 with their ends in alinement now approach the lever 48 which pushes each pin toward bearing 59. The distance each pin is moved is governed by the distance the ends of fingers 11 are forced apart by the beets conveyed rearwardly by the puller belts 10, said movement of the fingers 11 being proportionately transmitted to lever 48 by the mechanism heretofore described. The pins 51 thus set over varying distances by lever 48 continue upwardly on their arcuate path repeating the cycle just set forth.

A plate 77 (Figures 4 and 6) attached in any conventional manner to the inner side of the extension 70 of hub 59 has been provided to prevent pins 51 set over by the lever 48 from accidentally sliding out of the member 49. The chain 64 is made up of a plurality of flat links 127 joined by pins 79, said pins being held in place by their head 80 and cotter pin 81. Chain 64 is joined at one end to a plunger 82 by links 83 and pins 79, and at the other end to an arcuate shaped member 84 by the pin 79.

The projection 85 on the arcuate member 84 is joined to a plunger 89 by links 86 and pins 87. The plungers 82 and 89 are reciprocally mounted in bushings 90 and studs 91, said bushings 90 being secured to the holder 45. Studs 91 are in threaded relation with threaded apertures in holder 45, furnishing means to regulate the compressive strength of the heretofore mentioned springs 65 exerting pressure upon the plungers 82 and 89 at shoulders located at point 92. Locknuts 93 furnish means for maintaining the studs 91 in any fixed position. Cap-screws secure pin carrier holder 45 to one end of a drum shaped member 116. On the other end, and secured in the same manner, is a cover 115 protecting the mechanism from dirt and foreign material.

Legs 117 integral with the member 116 furnish means for securing the pin positioning mechanism to a channel support 118 (Figures 1 and 2) bolted to the transverse frame members 106 and 119. A retaining ring 120 secured in a groove 121 (Figure 4) prevents the escape of lubricant and excludes dirt and injurious substances from the enclosed mechanism.

A lever 95 (Figure 1), upon which is rotatably mounted the stud 96, is keyed to the lower end of shaft 94. The rod 97 reciprocably mounted in stud 96 connects lever 95 with lever 98 in which said rod is pivotally mounted. The lever 98 operates a knife holder 100 by means of strap 99 pivotally connecting both members, permitting said lever to raise or lower knives 101 secured in the holder 100, depending upon the impulse given to the lever 67 by the pins 51.

A full and complete description and illustration of the knives 101 is to be found in my Letters Patent No. 1,964,896, issued July 3, 1934, entitled Beet harvester.

A compression spring 110 is resiliently mounted upon one end of rod 97 protecting the mechanism from injury in case a beet or any foreign material should become lodged in the machine in a manner to prevent the lowering or raising of the knife holder 100. The pressure of spring 110 against the stud 96 is regulated by means of a nut 111 in threaded engagement with the end of rod 97. Bolts 112 pivotally secure the knife holder 100 to vertical supporting members 113 bolted to transverse frame member 114.

The beets grasped by the puller belts 10 and conveyed rearwardly in the machine pass between the ends of fingers 11 spreading said fingers apart at a distance equal to approximately the largest body diameter of said beet. This causes the rotation of shafts 14 to which are attached levers 27. The levers 27 operate the lever 33 by means of the equalizing mechanism consisting of the links 31 and strap 30 thus compensating for any added movement in lever 33 when the center of a beet is off a line passing longitudinally midway between the shafts 14.

The movement of lever 33 is in turn transmitted to the lever 41 through the rod 39, said lever 41 being secured to the shaft 43 (Figure 4). The action of lever 48 produced by the rotation of shaft 43 is to urge pins 51 in carrier 49 toward the bearing 59. It can therefore be said that each beet passing by fingers 11 sets one of the pins 51 in member 49. The amount each pin is set over is dependent upon the size of the beet.

The chain 64 and arcuate member 84 press against the set pins 51 due to the pressure of springs 65, thus forcing the ridges 66 on pins 51 to engage with the ridges 58 on member 49 preventing said pins from being pushed back when they engage with lever 67. Pins 51 force lever 67 toward bearing 59 for a distance equivalent to the amount said pins have been set over by lever 48.

This movement in lever 67 is transmitted to lever 95 through the shaft 94. Lever 95 raises or lowers the knife holder 100 by means of rod 97, lever 98, and strap 99. An additional adjustment for the knife holder 100 has been provided by hand lever 108 which raises or lowers the lever 98 pivotally mounted upon the lever 102 secured to shaft 103 by means of rod 109 and lever 107 keyed to shaft 103.

The rotation of the pin carrier 49 is regulated in such a manner that the pin 51 set by the beet passing between fingers 11 engages with lever 67 to position the rotary knives 101 to insure the removal of the proper amount of top from the body of the beet before said beet comes in contact with said knives 101.

Therefore, each beet passing by the fingers 11 automatically positions the topping means in a manner to insure proper topping thereof. The mechanism is set for all beets according to size.

The beets are removed from the puller belts 10 by bars 120, a full description of which as well as of the belts 10 and the knives 101 is set forth in the application for patent of William E. Urschel, given Serial Number 537,410, filed May 14, 1931, and entitled Beet harvester. Roller bars 120 convey the beets rearwardly and at the same time position said beets in such manner that the uppermost portions of the body of the beets are all in the same plane, a most favorable position to be acted upon by the topping means. The amount of a beet which is severed beneath this plane is determined by the size of the beet in the manner described.

Pins 51, after their disengagement with lever 67, are released from the interlocking position with ridges 58 on the surface of member 49 being forced outwardly from the axis of said member and are held in such position by the members 68 and 69. The wedge member 76 alines said pins 51 so that the ends of said pins are in alinement with each other due to the projecting pins 74 bearing against the extended portion of member 49. Pins 51 thus alined approach lever 48 and the cycle of operation herein described is again repeated.

Figure 7:
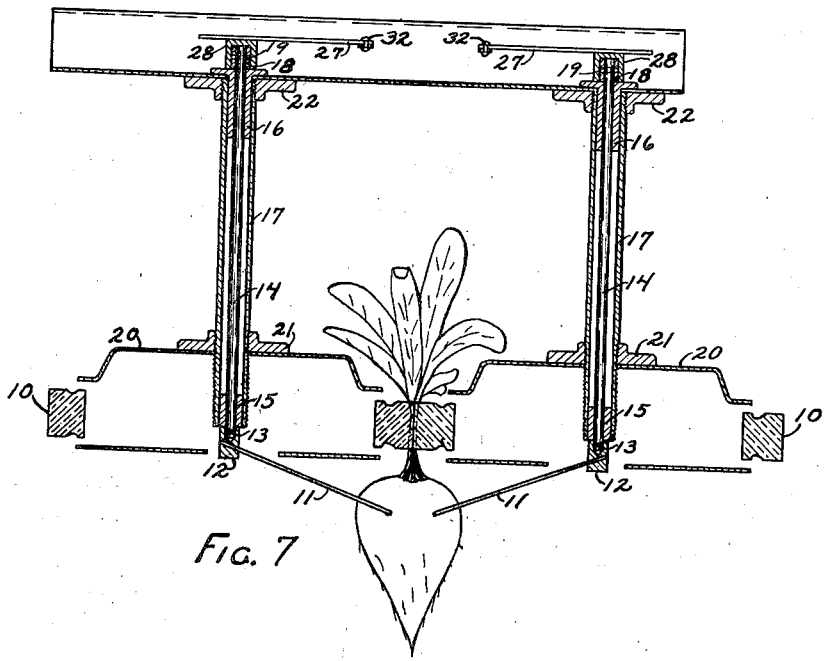
Figure 7 is a sectional view of the beet gauging apparatus taken on the line 7—7 in Figure 8 in the direction indicated by the arrows.

It will thus be seen that I have provided power actuated mechanism for rotating the drum 49 which carries the separately adjustable fingers 51, each one representing a fruit or vegetable to be topped, by means of the controllable device 48, and wherein when each finger is thus adjusted in proportion to the physical characteristics of its particular fruit or vegetable by the mechanism shown, for instance, in Figure 7. Means is provided for retaining the finger in such adjusted position and for bringing such retained finger into contact with the lever 67 whereby automatically to actuate the lever 67 by the application of the power rotation of the drum for power shifting or adjusting the cutting mechanism an amount proportional to the physical characteristics of such fruit or vegetable. It will be apparent that from the time the succession of fruit or vegetables, specifically any sugar beet as shown in Figure 9, passes the indexing means 11, shown in Figure 7, to the time such beet arrives at the cutting station, the interval consumed will be such that a plurality of the fingers 51 will have been adjustably set and will be rotating into actuating position, as shown in Figure 4, whereby each one in succession will actuate the lever 67 to shift the cutter.

Figure 8:
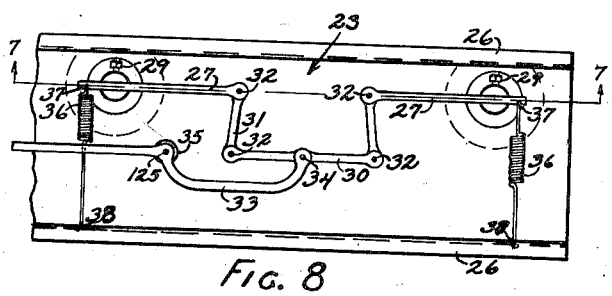
Figure 8 is a plan view of the apparatus used to set the knife positioning pins.

Thus I have provided indexing means of a delicate nature, quickly shiftable, capable of nice adjustment, and easily moved, which will contact with the sides of each fruit or vegetable and which will, in effect, calibrate the vegetable as to size so as to proportionately shift the lever mechanism 32 and 33, shown in Figure 8, whereby proportionately to shift the lever 48 shown in Figure 4. In other words, the movement of the fruit or vegetable past the calibrating fingers 11 requires substantially no applied force to shift the calibrating fingers 11 and to shift the finger 48. So, also, since the drum 49 is constantly rotating by means of the sprocket chain 63, it is constantly carrying the fingers 51 in a circular path. Those fingers which are approaching and are at the bottom of the path of travel of the drum have been released, not only by gravity, but also by passing out of the sphere of operation of the chain and arcuate member 84 so that in the lower positions these fingers 51 are free for endwise movement so that the slightest force applied to the end of any of these fingers 51 will shift them endwise any preselected amount. Accordingly, the slight movement of the finger 48 will serve successively to shift each of these independently adjustable fingers 51, each one representing a separate fruit or vegetable, and the finger thus shifted will be continuously carried around the circular path upwardly. As they approach the upper portion of their path of travel the weight of these fingers, plus the chain and the applied arcuate member 84, will force the fingers downwardly into engagement with the ratchet teeth 58 on the drum, whereby to retain them in their longitudinally adjusted position. In this position, as shown in Figure 4, they are then abreast of the shiftable lever 67 and during the rotation of the drum each one of these fingers in turn will actuate the lever 67, independently, a predetermined, preselected amount in accordance with the physical characteristics of the particular vegetable or fruit which has adjusted this finger, in the present instance the diameter of the sugar beet; and hence, due to the retention of this adjusted finger in its adjusted position, it will force the lever 67 a predetermined proportional amount whereby to power shift the cutter mechanism that same amount, so that by the time that the particular vegetable or fruit, to wit, the sugar beet, reaches the cutting station the finger will have traveled from its shifting station, where it is contacted by the lower portion of the lever 48, to the position where that finger will actuate the lever 67, which distance will correspond exactly with the travel of the beet from the finger calibrating station, shown in Figure 7, to the cutter station, shown in Figure 9. During this interval many other fingers will have been adjustably set by other beets in the line of moving beets. After the operation of the lever 69 each finger will then move on and will be reset to a zero position to be ready for the next cycle of operation.

It will be evident that by the above described invention I provide power means for shifting the cutter, and utilize the calibrating function of the fingers 11 for only setting the fingers 51 which requires practically no power and, therefore, can permit of a very delicate, fine adjustment of the fingers in accordance with the delicate movement of the calibrating finger 11. It will also be evident that by reason of this arrangement the fruits or vegetables may be topped irrespective of the spacing interval between the same, and irrespective of the speed with which they travel along the conveying means, and irrespective of the size of the fruits or vegetables; and that by reason of the fact that I utilize a separate power source for shifting the cutter the fruit itself is not subjected to any injurious operation by means of the calibrating device, since the latter requires substantially no pressure against the fruit or vegetable in order to accomplish the calibrating and the proportional shifting of the cutting mechanism.

What is claimed as new and is desired to be secured by Letters Patent of the United States is:

1. A beet topper comprising a conveyor, a cutting means movable relatively to said conveyor, means for moving said cutting means, indexing means in the path of beets in said conveyor for controlling the position of said cutting means, and means for delaying the change in position of said cutting means until subsequent to the discharge of beets from said conveyer after their engagement with the indexing means in the path of the conveyor.

2. A beet topper comprising a conveyor, a cutting means movable relatively to said conveyor, means for moving said cutting means, means in the path of beets in said conveyor for indexing the position of said cutting means in the order of the movement of beets in said conveyor, and means controlled by said indexing means for delaying the change in position of said cutting means until subsequent to the discharge of beets from said conveyor after their engagement with the indexing means in the path of the conveyor.

3. A beet topper comprising a conveyor, a knife shiftable relatively thereto, means for controlling the shifting of said knife, means in the path of beets in said conveyor for indexing the position to be assumed by said knife with respect to each beet, and means for delaying the operation of said knife as to each beet until after said beet has operated said indexing means and has been discharged from said conveyor into position to be operated upon by said knife.

4. A beet topper comprising a conveyor, a knife shiftable relatively thereto, means for controlling the shifting of said knife, means in the path of beets in said conveyor for indexing the position to be assumed by said knife with respect to each beet, and means bringing said knife into operation after such beet has acted upon said indexing means and has been discharged from said conveyor into position to be operated upon by said knife.

5. In the beet topper, a conveyor, a cutting means mounted for movement relative to said conveyor, means for shifting said cutting means and having a plurality of movable parts for controlling the position of said cutting means, means adjacent said conveyor and operated by engagement with beets on said conveyor for setting the position of said parts coincidently with the movement of a beet along said conveyor, and means for retarding the shifting of said cutting means under control of said parts until the beet determining the position of said parts is discharged from said conveyor.

6. In a beet topper, a conveyor, a knife, means for shifting the position of said knife, a gauging means for receiving the beets from said conveyor, means in the path of beets in said conveyor for determining a subsequent position of said knife, and means for retarding the movement of said knife until the beet affecting said positioning means has been engaged by said gauging means.

7. In a beet topper having means to transmit power to instrumentalities thereon, a conveyor, a knife, means for shifting the position of said knife, a gauging means for receiving beets from said conveyor, means in the path of beets in said conveyor for indexing a subsequent position of said knife, and means controlled by said indexing means and actuated by said power transmitting means for shifting the position of said knife in timed relation to the beet affecting said positioning means.

8. In a beef topper, a conveyor, a knife, means for shifting the position of said knife, a gauging means for receiving beets from said conveyor, means in the path of beets in said conveyor for indexing a subsequent position of said knife to coincide with the size of the beet actuating such indexing means, and means for timing the shift of said knife until the beet affecting said positioning means has been affected by said gauging means.

9. In a device of the class described, the combination of means for conveying a succession of objects to be sliced, slicing means in the path of movement of said objects for slicing a section from each one, calibrating means in the path of movement of each of said objects and shiftable variantly by the differing dimension of each of said objects, and independent power actuated means controlled by the movement of said calibrating means for variantly shifting said slicing means for each object in accordance with the movement of the calibrating means by such object.

10. In a beet harvesting machine, the combination of conveying means for conveying a succession of sugar beets therealong, topping means in the path of movement of said beets for slicing a section therefrom, calibrating means shiftable variantly by the varying dimensions of each of said beets, and independent power means controlled by said calibrating means for adjustably and variantly shifting said topping means.

11. In a beet harvesting machine, the combination of conveying means for conveying a succession of sugar beets therealong, topping means in the path of movement of said beets for slicing a section therefrom, calibrating means shiftable variantly by the varying dimensions of each of said beets, independent power means controlled by said calibrating means for adjustably and variantly shifting said topping means, and manually actuatable means independent of said power means for adjustably shifting said topping means.

12. In a device of the class described, the combination of topping means, a plurality of adjustable means, means for conveying a plurality of objects to be topped, each of said objects varying as to a preselected dimension, means variantly shiftable by each of said objects a distance proportional to its preselected dimension for moving a corresponding one of said adjustable means to a position proportional to the preselected dimension of the object moving it, and separate power actuated means for causing each of said adjustably shiftable means to shift the topping means in accordance with the preselected dimension of said object which shifts said adjustable means.

13. In a device of the class described, the combination of topping means, power means for shifting the topping means, means for conveying a succession of objects to be topped, shiftable means disposed in the path of travel of said objects and adapted to be shifted a predetermined amount to correspond with a predetermined physical characteristic of each object in the succession, and means automatically actuated by the predetermined movement of said shiftable means independent of said variantly shiftable means for causing the power means to shift the topping means to position to top an object an amount corresponding to its predetermined physical characteristic.

14. In a device of the class described, the combination of topping means, adjustable means, means for conveying a succession of objects to be topped, means variantly shiftable by any one of the succession of objects to be topped for moving said adjustable means to a position corresponding with the amount said variantly shiftable means is moved by any particular object, means for retaining said adjustable means in its adjustably shifted position, and power actuated means for causing said adjustably shiftable means to shift the topping means in accordance with the amount of movement of said adjustably shiftable means.

15. In a device of the class described, the combination of topping means, adjustable means, means for conveying an object to be topped, means variantly shiftable by said object a distance proportional to a preselected dimension of said object for moving said adjustable means to a position proportional to the preselected dimension of said object, and power actuated means independent of said variantly shiftable means for causing said adjustably shiftable means to shift the topping means in accordance with said preselected dimension of said object.

16. In a device of the class described, the combination of topping means, means for conveying a succession of sugar beets, a plurality of adjustable means, calibrating means disposed in the path of movement of each of said sugar beets and adapted to be shifted a distance proportional to the diameter of each sugar beet, and separate power means for actuating each of said adjustable means for shifting the topping means a distance proportional to the adjusted position of each of said adjustable means.

17. In a sugar beet harvesting machine, the combination of a vehicle adapted to move along the ground and including conveying means along which a succession of beets is conveyed, topping means disposed in the path of movement of said beets for slicing a section therefrom, calibrating means disposed in the path of movement of said beets in advance of said topping means and shiftable an amount proportional to the variations in dimension of each of said beets, adjustable means disposed on said machine, means actuated by the movement of said calibrating means for adjustably shifting said adjustable means proportional to the calibration of a particular beet, means derived from a further source of power on said machine for moving said adjustable means for causing it to shift the topping means upon the arrival of said beet at said topping means an amount proportional to the calibration of said particular beet.

18. In a sugar beet harvesting machine, the combination of a vehicle adapted to move along the ground and including conveying means along which a succession of beets is conveyed, topping means disposed in the path of movement of said beets for slicing a section from each one, calibrating means disposed in the path of movement of said beets in advance of said topping means and shiftable an amount proportional to the variations in dimension of each of said beets, a plurality of adjustable means shiftably disposed on said machine and adapted to move in a predetermined path from a setting station to an actuating station, means actuated by the movement of said calibrating means for independently and adjustably shifting each of said adjustable means at said setting station proportional to the calibration of each beet as it passes the calibrating means, means for moving said adjustable means from said setting station to said actuating station and for causing each of said means at said latter station independently to shift said topping means an amount proportional to the adjustment of each adjustable means.

19. In a sugar beet harvesting machine, the combination of a vehicle adapted to move along the ground and including conveying means along which a succession of beets is conveyed, topping means disposed in the path of movement of said beets for slicing a section from each one, calibrating means disposed in the path of movement of said beets in advance of said topping means and shiftable an amount proportional to the variations in dimension of each of said beets, a plurality of adjustable means shiftably disposed on said machine and adapted to move in a predetermined path from a setting station to an actuating station, means actuated by the movement of said calibrating means for independently and adjustably shifting each of said adjustable means at said setting station proportional to the calibration of each beet as it passes the calibrating means, means for moving said adjustable means from said setting station to said actuating station and for causing each of said means at said latter station independently to shift said topping means an amount proportional to the adjustment of each adjustable means, and means for resetting said adjustable means.

20. In a sugar beet harvesting machine, the combination of means for conveying a succession of sugar beets, calibrating means in the path of movement of said beets and adapted to be adjustably shifted thereby, topping means for the beets, a rotary drum, power means for rotating said drum, a plurality of devices mounted concentrically about the axis of said drum and carried by said drum, each of said devices being freely adjustable relatively to said drum and to each other, means actuated by the movement of said calibrating means for independently adjusting each of said devices relatively to said drum in accordance with the movement of said calibrating device, means for locking each of said devices in its adjusted position, and means actuated by the movement of each of said devices when in its adjusted position for shifting the topping means an amount to correspond with the adjustment of said device to cause the topping device to slice a portion from each beet proportional to the calibrated dimension of said beet.

21. In a sugar beet harvesting machine, the combination of means for conveying a succession of sugar beets, calibrating means in the path of movement of said beets and adapted to be adjustably shifted thereby, topping means for the beets, a rotary drum, power means for rotating said drum, a plurality of devices mounted concentrically about the axis of said drum and carried by said drum, each of said devices being freely adjustable relatively to said drum and to each other, means actuated by the movement of said calibrating means for independently adjusting each of said devices relatively to said drum in accordance with the movement of said calibrating device, means for locking each of said devices in its adjusted position, means actuated by the movement of each of said devices when in its adjusted position for shifting the topping means an amount to correspond with the adjustment of said device to cause the topping device to slice a portion from each beet proportional to the calibrated dimension of said beet, and means for releasing the locking means for said devices and means for resetting each of said devices to a common initial position.

22. In a device of the class described, the combination of means for conveying a succession of objects to be sliced, calibrating means for contacting each of said objects and including means shiftable by variations in calibration of successive objects, adjustable means successively shifted proportional to the calibrated variations of each of said succession of objects, slicing means, and independent power means for producing an adjustment relatively between the slicing means and each of said objects to slice a portion from each object to correspond with the successive calibrated variations of said succession of objects.

WILLIAM E. URSCHEL.